United States Patent
Lee et al.

(10) Patent No.: US 12,385,687 B2
(45) Date of Patent: Aug. 12, 2025

(54) REFRIGERATOR

(71) Applicant: LG ELECTRONICS INC., Seoul (KR)

(72) Inventors: Sanggyun Lee, Seoul (KR); Younseok Lee, Seoul (KR); Yongwon Dong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 103 days.

(21) Appl. No.: 18/020,009

(22) PCT Filed: Jul. 23, 2021

(86) PCT No.: PCT/KR2021/009558
§ 371 (c)(1),
(2) Date: Feb. 6, 2023

(87) PCT Pub. No.: WO2022/030833
PCT Pub. Date: Feb. 10, 2022

(65) Prior Publication Data
US 2023/0288129 A1    Sep. 14, 2023

(30) Foreign Application Priority Data

Aug. 7, 2020 (KR) .................. 10-2020-0099091

(51) Int. Cl.
*F25D 23/02* (2006.01)
*E05F 1/12* (2006.01)
*F16C 11/04* (2006.01)

(52) U.S. Cl.
CPC .......... *F25D 23/028* (2013.01); *E05F 1/1207* (2013.01); *F16C 11/04* (2013.01); *E05Y 2900/31* (2013.01)

(58) Field of Classification Search
CPC .. F25D 23/028; F25D 2323/024; F16C 11/04; E05F 1/1207; E05Y 2900/31
See application file for complete search history.

(56) References Cited

U.S. PATENT DOCUMENTS 5,138,743 A * 8/1992 Hoffman ............... E05F 1/1223
16/303
10,584,524 B2   3/2020 Fang et al.
(Continued)

FOREIGN PATENT DOCUMENTS

CN       103363755 A    10/2013
CN       106766595 A    5/2017
(Continued)

*Primary Examiner* — James O Hansen
(74) *Attorney, Agent, or Firm* — Bryan Cave Leighton Paisner LLP

(57) ABSTRACT

A refrigerator comprises: a cabinet including a storage space; a hinge bracket coupled to the cabinet; a door which is rotatably coupled to a shaft included in the hinge bracket and opens/closes the storage space; and an auto-closing device installed at the door in a position spaced apart from the center line of rotation of the door, the auto-closing device operating such that same acts with the hinge bracket while the door is being closed, thereby causing the door to automatically be closed. The auto-closing device may include a lever and an elastic member for elastically supporting the lever. The hinge bracket may include a contact surface which is brought into contact with the lever while the door is being closed. The contact surface may be formed such that, with reference to the front surface of the cabinet, while a contact part of the lever moves along one portion of the contact surface, the contact part approaches the front surface of the cabinet, and, while the contact part moves along another portion of the contact surface, the contact part becomes more distant from the front surface of the cabinet.

20 Claims, 12 Drawing Sheets

(56) References Cited

U.S. PATENT DOCUMENTS

| | | | |
|---|---|---|---|
| 2006/0232176 A1* | 10/2006 | Kim | .................... E05D 3/12 |
| | | | 312/401 |
| 2013/0264930 A1 | 10/2013 | Kim et al. | |
| 2023/0304726 A1 | 9/2023 | Lee et al. | |

FOREIGN PATENT DOCUMENTS

| | | |
|---|---|---|
| DE | 102013224272 A1 | 5/2015 |
| EP | 2650626 A2 | 10/2013 |
| EP | 4194781 A1 | 6/2023 |
| JP | 2001-173306 A | 6/2001 |
| KR | 10-0874633 B1 | 12/2008 |
| KR | 10-2015-0047976 A | 5/2015 |
| KR | 10-1910655 A | 10/2018 |
| KR | 10-1978452 B1 | 5/2019 |

\* cited by examiner

REFRIGERATOR

CROSS-REFERENCE TO RELATED APPLICATIONS

This application is the National Stage Application of International Application No. PCT/KR2021/009558, filed on Jul. 23, 2021, which claims the benefit of Korean Application No. 10-2020-0099091, filed on Aug. 7, 2020, the contents of which are all hereby incorporated by reference herein in their entirety.

TECHNICAL FIELD

The present disclosure relates to a refrigerator.

BACKGROUND ART

In general, refrigerators are home appliances for storing foods at low temperature in an inner storage space covered by a refrigerator door. Here, the inside of the storage space is cooled using cool air that is generated by being heat-exchanged with a refrigerant circulated in a refrigeration cycle to store the foods in an optimal state.

The refrigerator may be independently placed in a kitchen or living room or may be accommodated in a space defined by a furniture cabinet of the kitchen.

As the refrigerator increases in size more and more, and multi-functions are provided to the refrigerator due to dietary life changes and pursues of high quality, refrigerators of various structures in consideration of user convenience are being brought to the market.

The refrigerator may include a cabinet defining a storage space and a door connected to the cabinet and having the storage space. A door storage portion for storing food may be provided in the door. When the door storage portion is provided, a lot of force is required for the user to close the door due to weight of the food stored in the door storage portion as well as a weight of the door itself.

In order for the user to easily close the door, recently, the refrigerator is provided with a hinge device for automatically closing the door when the door is closed at a certain angle.

An automatic return hinge device including a restoring device is disclosed in Korean Patent Registration No. 10-0874633.

In the document, the hinge device may include a body, a clutch device mounted inside the body, a shaft coupled to pass through the clutch device, and a first spring that transmits restoring force to the shaft when the door is closed.

The shaft serves to provide a rotational center of the door, and the first spring in the form of a coil spring is disposed in a direction parallel to the shaft.

In the case of the document, since the restoration device is disposed in a direction parallel to the rotational center of the door, a space for positioning the restoration device as high as the height of the restoration device is required in the door, and thus, there is a restriction in installing the restoration device.

In addition, the position of the rotational center of the door may vary according to a thickness of the door, and when the thickness of the door becomes thin, it may be impossible to install the restoration device in a direction parallel to the rotational center of the door.

SUMMARY

Embodiments provide a refrigerator provided with an auto closing device installed in a door regardless of a thickness of a door to provide closing force of the door.

Additionally or optionally, embodiments also provide a refrigerator in which a phenomenon, in which when a door is closed, the door opens again due to excessive closing force of the door, which is prevented from occurring by an auto closing device.

In one embodiment, a refrigerator includes: a cabinet having a storage space; a hinge bracket coupled to the cabinet; a door rotatably coupled to a shaft provided on the hinge bracket and configured to open and close the storage space; and an auto closing device installed in the door at a position spaced apart from a rotational center line of the door and configured to interact with the hinge bracket in a process of closing the door to automatically close the door. Thus, closing force may be provided to the door by using an auto closing device regardless of a thickness of the door.

The auto closing device may include a lever and an elastic member configured to elastically support the lever. The hinge bracket may include a contact surface that is in contact with the lever in the process of closing the door.

The contact surface may be provided so that, while a contact portion of the lever moves along a portion of the contact surface, the contact portion gets closer to the front surface of the cabinet, and while the contact portion moves along the other portion of the contact surface, the contact portion is away from the front surface of the cabinet. Thus, when the door is closed by the auto closing device, a phenomenon in which the door is closed and then opened again due to excessive closing force of the door may be prevented.

When a line perpendicular to the front surface of the cabinet while passing through the rotational center line of the door is a virtual line, the contact surface may include: a first surface inclined in a direction that is away from the virtual line as the first surface is closer to the front surface of the cabinet; a second surface inclined in a direction that gets closer to the virtual line as the second surface is closer to the front surface of the cabinet; and a third surface configured to extend in the direction that gets closer to the virtual line as the third surface further is away from the front surface of the cabinet.

While the contact portion of the lever moves along the first surface and the second surface, the contact portion may get closer to the front surface of the cabinet, and while the contact portion of the lever moves along the third surface, the contact portion may be away from the front surface of the cabinet.

When the door is in the closed state, the contact portion of the lever may be maintained in a state of being in contact with the third surface.

While the contact portion of the lever moves along the first surface and the second surface, the contact portion may get closer to a rear surface of the door, and while the contact portion of the lever moves along the third surface, the contact portion may be away from the rear surface of the door.

While the contact portion of the lever moves along the first surface, the contact portion may get closer to a rear surface of the door, while the contact portion of the lever moves along a portion of the second surface, the contact portion may get closer to the rear surface of the door, while the contact portion of the lever moves along a remaining portion of the second surface, the contact portion may be away from the rear surface of the door, and while the contact portion of the lever moves along the third surface, the contact portion may be away from the rear surface of the door.

When the door rotates in a first direction to be closed, while the contact portion of the lever moves along the first surface and the second surface, the lever may rotate in a second direction opposite to the first direction, and while the contact portion of the lever moves along the third surface, the lever may rotate in the first direction.

When the door rotates in a first direction to be closed, while the contact portion of the lever moves along the first surface, the lever may rotate in a second direction opposite to the first direction, while the contact portion of the lever moves along a portion of the second surface, the lever may rotate in the second direction, while the contact portion of the lever moves along a remaining portion of the second surface, the lever may rotate in the first direction, and while the contact portion of the lever moves along the third surface, the lever may rotate in the first direction.

When the door rotates in a direction to be closed, while the contact portion of the lever moves along the first surface, the lever may rotate in a second direction opposite to the first direction, while the contact portion of the lever moves along the second surface, the lever may rotate in the first direction, and while the contact portion of the lever moves along the third surface, the lever may rotate in the first direction.

The lever may rotate based on a rotational center line spaced apart from the rotational center line of the door. In the state in which the door is closed, the rotational center line of the lever may be disposed closer to the front surface of the cabinet than the rotational center line of the door.

The elastic member may be a torsion spring.

The lever may include a roller rotatably coupled to the lever, and the contact portion may be the roller.

The auto closing device may include: a body configured to accommodate the elastic member; and a connector connected to the elastic member within the body, wherein the connector may include a lever coupling portion configured to extend to the outside of the body, and the lever may be coupled to the lever coupling portion. The connector may rotate together with the lever.

The elastic member may include: a body portion provided by winding a wire several times; and an extension portion configured to extend from the body portion, wherein the extension portion may be coupled to the connector at a position spaced apart from a rotational center line of the connector.

In another embodiment, a refrigerator includes: a cabinet having a storage space; a hinge bracket coupled to the cabinet; a door rotatably coupled to a shaft provided on the hinge bracket and configured to open and close the storage space; and an auto closing device installed in the door at a position spaced apart from a rotational center line of the door and configured to interact with the hinge bracket in a process of closing the door to automatically close the door, wherein the auto closing device includes a lever and an elastic member configured to elastically support the lever, and the hinge bracket includes a contact surface that is in contact with the lever in the process of closing the door, wherein the contact surface is provided so that, while a contact portion of the lever moves along a portion of the contact surface, the contact portion gets closer to the rear surface of the door, and while the contact portion moves along the other portion of the contact surface, the contact portion is away from the rear surface of the door.

In further another embodiment, a refrigerator includes: a door; and an auto closing device configured to provide closing force to the door, wherein the auto closing device includes: a lever; and an elastic member configured to elastically support the lever.

The hinge bracket may include a contact surface that is in contact with the lever in the process of closing the door. In the process of closing the door, while the contact portion of the lever moves along a portion of the contact surface, elastic force accumulated in the elastic member may increase, and while the contact portion of the lever moves along the other portion of the contact surface, the elastic force accumulated in the elastic member may decrease. In a section in which the elastic force of the elastic member decreases, the elastic force of the elastic member may act as closing force of the door.

When a line perpendicular to the front surface of the cabinet while passing through the rotational center line of the door is a virtual line, the contact surface may include: a first surface inclined in a direction that is away from the virtual line as the first surface is closer to the front surface of the cabinet; a second surface inclined in a direction that gets closer to the virtual line as the second surface is closer to the front surface of the cabinet; and a third surface configured to extend in the direction that gets closer to the virtual line as the third surface is further away from the front surface of the cabinet.

In the process of closing the door, when the contact portion of the lever moves along the first surface and the second surface, the elastic force accumulated in the elastic member may increase, and when the contact portion of the lever moves along the third surface, the elastic force accumulated in the elastic member may decrease. When the door is in the closed state, the contact portion of the lever may be maintained in a state of being in contact with the third surface.

In the process of closing the door, when the contact portion of the lever moves along the first surface, the elastic force accumulated in the elastic member may decrease, and when the contact portion of the lever moves along a portion of the second surface, the elastic force accumulated in the elastic member may further increase, and also, when the contact portion of the lever moves along the other portion of the second surface, the elastic force accumulated in the elastic member may decrease, and when the contact portion of the lever moves along the third surface, the elastic force accumulated in the elastic member may decrease.

In the process of closing the door, when the contact portion of the lever moves along the first surface, the elastic force accumulated in the elastic member may increase, when the contact portion of the lever moves along the second surface, the elastic force accumulated in the elastic member may decrease, and when the contact portion of the lever moves along the third surface, the elastic force accumulated in the elastic member may decrease.

The elastic force accumulated in the elastic member in the state in which the door is closed may be equal to or greater than that accumulated in the elastic member in the state in which the lever is spaced apart from the contact surface by the opening of the door.

In further another embodiment, a refrigerator includes: a cabinet having a storage space; a hinge bracket coupled to the cabinet; a door rotatably coupled to a shaft provided on the hinge bracket and configured to open and close the storage space; and an auto closing device installed in the door at a position spaced apart from a rotational center line of the door and configured to interact with the hinge bracket in a process of closing the door to automatically close the door, wherein the auto closing device comprises a lever configured to rotate based on a rotational center line spaced apart from a rotational center line of the door, and an elastic member configured to increase or decrease in elastic force accumulated while the lever rotates.

In the state in which the door is closed, the rotational center line of the door may be disposed closer to a front surface of the door than a rear surface of the door, and the rotational center line of the lever may be disposed closer to the rear surface of the door than the rotational center line of the door.

The hinge bracket may include a contact surface that is in contact with the lever in the process of closing the door.

The contact surface may be provided so that, while a contact portion of the lever moves along a portion of the contact surface, the contact portion gets closer to the front surface of the cabinet, and while the contact portion moves along the other portion of the contact surface, the contact portion is away from the front surface of the cabinet.

In the state in which the door is closed, a portion of the contact surface, which is in contact with the lever, may be disposed closer to the front surface of the door than the rotational center line of the lever.

According to the proposed embodiments, since the auto closing device is disposed to be spaced apart from the rotational center line of the door, even when the thickness of the door is reduced, the closing force may be provided to the door when the door is closed.

In addition, according to this embodiment, when the door is closed by the auto closing device, the phenomenon in which the door is closed and then opened again due to the excessive closing force of the door, may be prevented from occurring.

DETAILED DESCRIPTION

Figure 1:
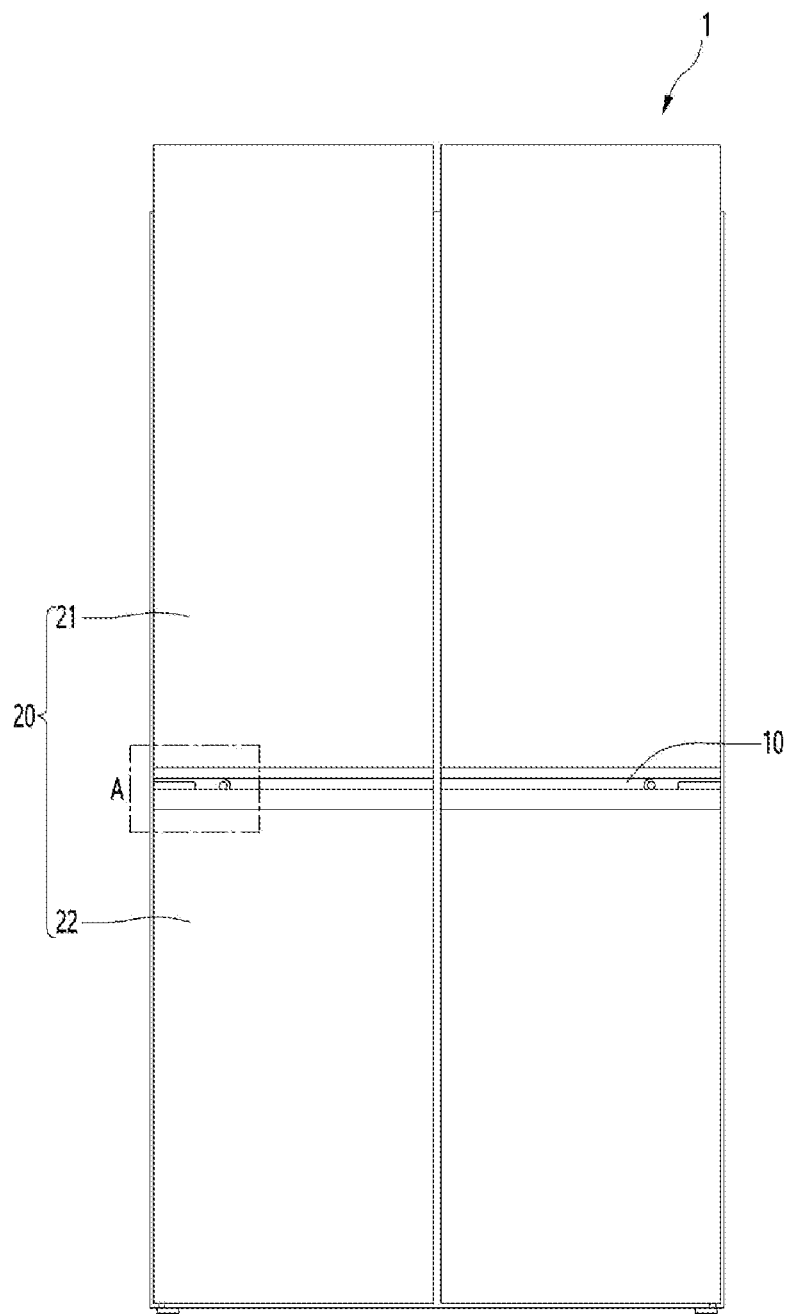
FIG. 1 is a front view of a refrigerator according to an embodiment.

Hereinafter, embodiments of the present disclosure will be described in detail with reference to the accompanying drawings. It should be noted that when components in the drawings are designated by reference numerals, the same components may have the same reference numerals even though the components are illustrated in different drawings. Further, in description of embodiments of the present disclosure, when it is determined that detailed descriptions of well-known configurations or functions obscure the understanding of the embodiments of the present disclosure, the detailed descriptions may be omitted.

Also, in the description of the embodiments of the present disclosure, the terms such as first, second, A, B, (a) and (b) may be used. Each of the terms is merely used to distinguish the corresponding component from other components, and does not delimit an essence, an order or a sequence of the corresponding component. It should be understood that when one component is "connected", "coupled" or "joined" to another component, the former may be directly connected or jointed to the latter or may be "connected", coupled" or "joined" to the latter with a third component interposed therebetween.

Figure 2:
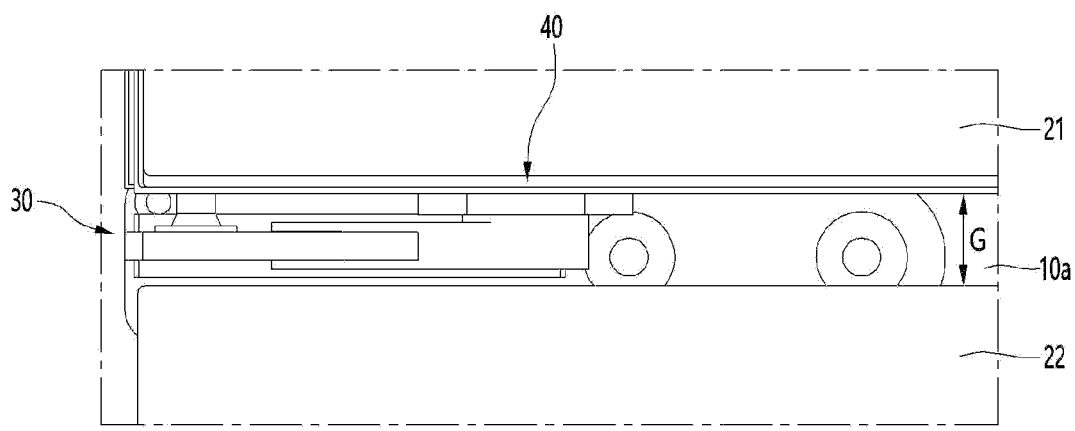
FIG. 2 is an enlarged view illustrating a portion A of FIG. 1.

FIG. 1 is a front view of a refrigerator according to an embodiment, and FIG. 2 is an enlarged view illustrating a portion A of FIG. 1.

Referring to FIGS. 1 and 2, a refrigerator 1 according to an embodiment may be installed independently in a kitchen or installed in an indoor furniture cabinet or wall. When the refrigerator 1 is installed in the indoor furniture cabinet, the refrigerator 1 may be installed alone or arranged side by side with another refrigerator.

The refrigerator 1 may include a cabinet 10 having a storage space and a refrigerator door 20 that opens and closes the storage space.

The storage space may not be limited, but may be divided into an upper first space and a lower second space, and the refrigerator door 20 may also include a first door 21 that opens and closes the first space and a second door 22 that opens and closes the second space.

The first space may be a refrigerating compartment, and the second space may be a freezing compartment or vice versa. Alternatively, the storage space may include a first space and a second space, which are divided into left and right sides. Alternatively, the storage space may be a single space, and a single refrigerator door may open and close the storage space.

At least one or more of the first door 21 and the second door 22 may be a rotation type door. Alternatively, the single refrigerator door 20 may be a rotation type door.

In this embodiment, the rotation type refrigerator door 20 may include an auto closing device 40 that provides closing force to the refrigerator door 20 in a state in which the refrigerator door 20 is opened and then closed again at a certain angle.

In FIG. 2, an example in which the auto closing device 40 is provided in the first door among the first door and the second door, which are arranged in a vertical direction will be described. It should be noted that the position of the auto closing device 40 is not limited.

When the first door 21 and the second door 22 are arranged in the vertical direction, a hinge bracket 30 is provided between the first door 21 and the second door 22.

The hinge bracket 30 may provide a rotational center of the first door 21. Alternatively, the hinge bracket may also be disposed at an upper side of the first door 21.

The hinge bracket 30 may be fixed to a front surface 10*a* of the cabinet 10. A gap G having a predetermined size is defined between the first door 21 and the second door 22. A portion of the hinge bracket 30 is disposed between the first door 21 and the second door 22 so that the first door 21 and the second door 22 rotate without interfering with each other, and also is spaced apart from a top surface of the second door 22 as well as a bottom surface of the first door 21.

The auto closing device 40 according to this embodiment may provide closing force to the first door 21 in a process of closing the first door 21 while acting with the hinge bracket 30. Alternatively, the auto closing device 40 may provide the closing force to the second door 22.

In order for the auto closing device 40 to provide the closing force to the first door 21, the auto closing device 40 may be installed in the first door 21.

The auto closing device 40 may be installed at a lower side of the first door 21, and in order to interact with the hinge bracket 30, a portion of the auto closing device 40 may protrude downward from the bottom surface of the first door 21.

When the auto closing device 40 is installed at the lower side of the first door 21, the auto closing device 40 may not be easily seen from the outside while the first door 21 is opened and closed. A body to be described later may be inserted into the lower side of the first door 21, and a lever may protrude to the outside of the first door 21.

The auto closing device 40 may be spaced apart from a top surface of the second door 22 so that the auto closing device 40 does not interfere with the second door 22.

Figure 3:
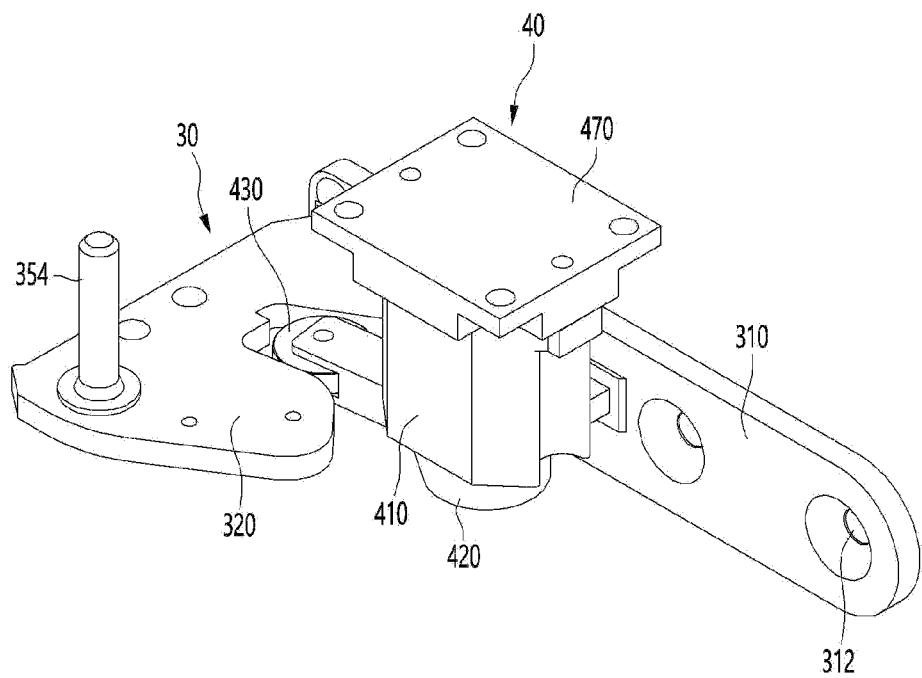
FIG. 3 is a perspective view illustrating a hinge bracket and an auto closing device according to an embodiment.

FIG. 3 is a perspective view illustrating the hinge bracket and the auto closing device according to an embodiment.

For example, FIG. 3 illustrates relative positions of the auto closing device 40 and the hinge bracket 30 in the state in which the first door 21 is closed.

Referring to FIGS. 2 and 3, the hinge bracket 30 may include a coupling portion 310 to be coupled to the cabinet 10, and a bracket body 320 extending horizontally from the coupling portion 310. For example, the coupling portion 310 may be coupled to a front surface 10a of the cabinet 10.

The coupling portion 310 may include one or more coupling holes 312. A coupling member may be coupled to the cabinet 10 through the coupling holes 312.

A height of the bracket body 320 may be less than that of the coupling portion 310. The bracket body 320 may extend in a horizontal direction from a position spaced apart from upper and lower ends of the coupling portion 310. For example, the bracket body 320 may extend from an intermediate portion of the coupling portion 310.

A shaft 354 may be provided in the bracket body 320. The shaft 320 may protrude upward from a top surface of the bracket body 320. The shaft 354 is coupled to the first door 21 to provide a rotational center of the first door 21.

The auto closing device 40 may be disposed at a position spaced apart from the shaft 354 in the horizontal direction. That is, the auto closing device 40 may be coupled to the first door 21 at a position spaced apart from the shaft 354.

The auto closing device 40 rotates together with the first door 21, and in the process of closing the first door 21, the auto closing device 40 interacts with the bracket body 320 to provide the closing force to the first door 21.

Hereinafter, the auto closing device 40 will be described in detail.

Figure 4:
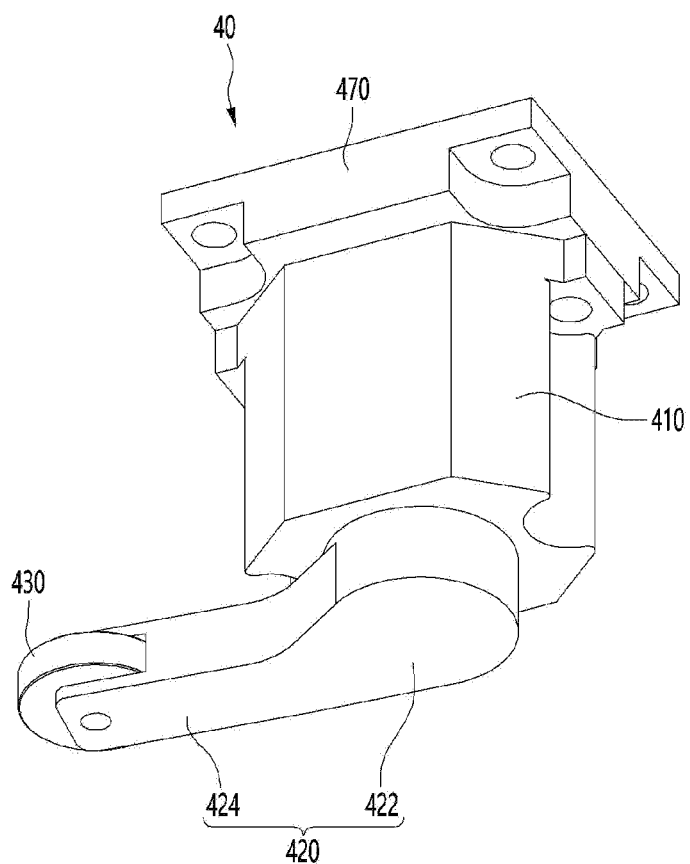
FIG. 4 is a perspective view of an auto closing device when viewed from the below according to an embodiment.
Figure 5:
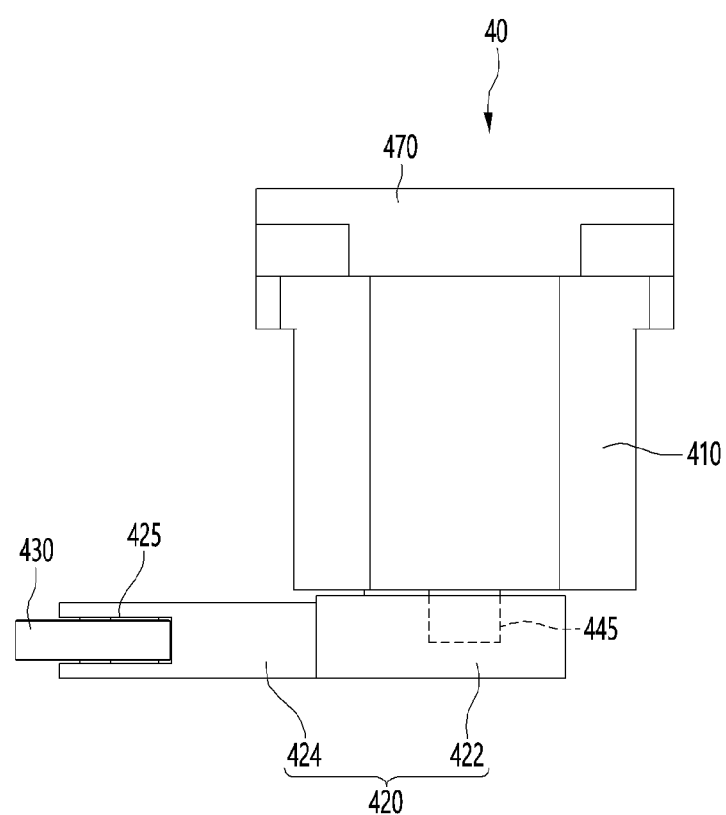
FIG. 5 is a side view of the auto closing device according to an embodiment.
Figure 6:
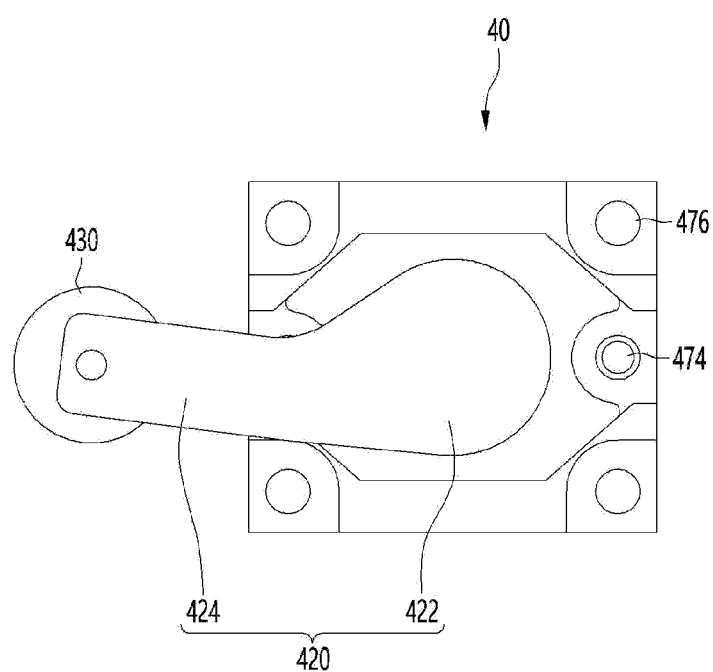
FIG. 6 is a bottom view of the auto closing device according to an embodiment.
Figure 7:
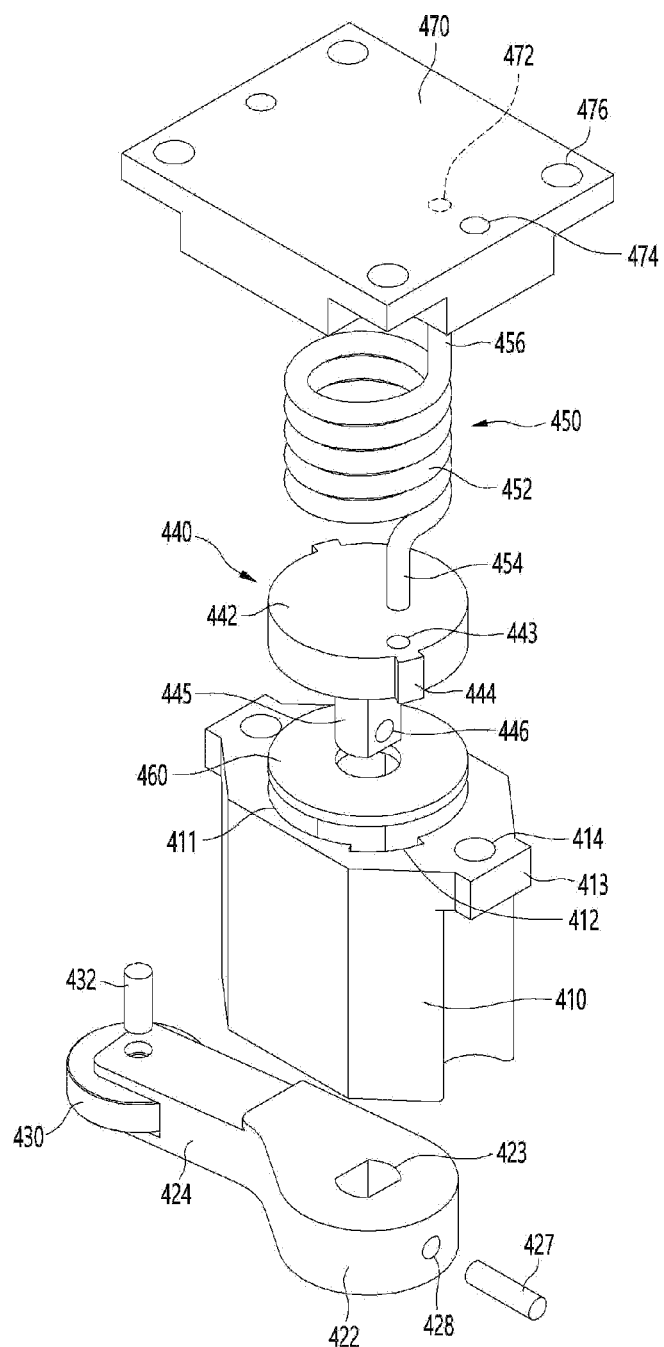
FIG. 7 is an exploded perspective view of the auto closing device according to an embodiment.

FIG. 4 is a perspective view of the auto closing device when viewed from the below according to an embodiment, FIG. 5 is a side view of the auto closing device according to an embodiment, FIG. 6 is a bottom view of the auto closing device according to an embodiment, and FIG. 7 is an exploded perspective view of the auto closing device according to an embodiment.

Referring to FIGS. 3 to 7, the auto closing device 40 according to this embodiment may include a body 410, an elastic member 450 accommodated in the body 410, and a lever 420 connected to the elastic member 450.

The body 410 may define an outer appearance of the auto closing device 40.

The lever 420 may be outside the body 410 and directly or indirectly connected to the elastic member 450 to rotate with respect to the body 410.

For example, the lever 420 may rotate in the horizontal direction based on a rotational center line extending in the vertical direction. That is, the rotational center line of the first door 21 and the rotational center line of the lever 420 may be parallel to each other and spaced apart from each other in the horizontal direction.

The body 410 may include an upper opening. The body 410 may further include an accommodation space 411. The elastic member 450 may be accommodated in the accommodation space 411 through the upper opening.

The body 410 may include one or more coupling extension portions 413. A coupling hole 414 may be defined in a coupling extension portion 413. Although not limited, the plurality of coupling extension portions 413 may be disposed to extend horizontally from the body 410.

The auto closing device 40 may further include a connector 440 accommodated in the body 410.

The connector 440 may be connected to the lever 420 to rotate together with the lever 420. Also, the connector 440 may be connected to the elastic member 450. That is, the connector 440 connects the elastic member 450 to the lever 420.

A rotational center of the connector 440 may be the same as the rotational center of the lever 420.

The connector 440 may be accommodated in the accommodation space 411 through the upper opening of the body 410.

The connector 440 may include a connector body 442 and a lever coupling portion 445 extending downward from the connector body 442.

The elastic member 450 may be coupled to the connector body 442. A lower portion of the elastic member 450 may be connected to the connector body 442.

A connection groove 443 may be defined in a top surface of the connector body 442. The connection groove 443 may be spaced apart from the rotational center of the connector 440 in a radial direction.

A diameter of the connector body 442 may be the same as or slightly less than that of the accommodation space 411. Thus, movement of the connector body 442 in the accommodation space 411 in the horizontal direction may be minimized.

The connector body 442 may be provided, for example, in a circular plate shape. A protrusion 444 may be provided on a side surface of the connector body 442. The protrusion 444 may protrude outward in the radial direction from a side surface of the connector body 442.

The body 410 may include an accommodation portion 412 in which the protrusion 444 is accommodated. The accommodation portion 412 may be provided from the top surface of the body 410 and is recessed downward. Therefore, when the connector 440 is accommodated in the accommodation space 411 from the upper side, the protrusion 444 may be accommodated in the accommodation portion 412 without interfering with the body 410. The accommodation portion 412 may extend radially outward from the accommodation space 411.

A horizontal length (or length in a circumferential direction) of the accommodation portion 412 may be greater than a horizontal length (or length in a circumferential direction) of the protrusion 444.

Thus, the connector 440 may rotate within a length range of the accommodation portion 412 in the state in which the protrusion 444 is accommodated in the accommodation portion 412.

The protrusion 444 and the accommodation portion 412 may restrict the horizontal movement of the connector 440 as well as the rotation range. That is, the connector 440 may rotate within a predetermined angle range due to a length difference between the protrusion 444 and the accommodation portion 412. Since the lever 420 is connected to the connector 440, the lever 420 may also be restricted to rotate within the predetermined angle range.

The lever coupling portion 445 may be smaller than the diameter of the connector body 442. The lever coupling portion 445 may extend downward from a bottom surface of the connector body 442.

Although not shown, the body 410 may include a lower wall, and the lever coupling portion 445 may pass through the lower wall. The lever coupling portion 445 passing through the lower wall may protrude downward from the body 410.

A portion of the lever coupling portion 445 protruding from the lower wall of the body 410 may be coupled to the lever 420.

A vertical length of the lever coupling portion 445 may be longer than that of the connector body 442.

The lever coupling portion 445 may be inserted into the lever 420. A horizontal cross-section of the lever coupling portion 445 may be provided in a non-circular shape so that the lever coupling portion 445 is prevented from rotating relative to the lever 420 while coupled to the lever 420.

A pin insertion hole 446 may be provided in the lever coupling portion 445. The lever coupling portion 445 may be coupled to the lever 420 in the vertical direction, and the pin insertion hole 446 may extend in the horizontal direction.

The lever 420 may include a first portion 422 coupled to the connector 440. The first portion 422 may also be referred to as a connector coupling portion.

The first portion 422 may include a coupling slot 423 into which the lever coupling portion 445 is inserted. The coupling slot 423 may be defined by being recessed downward from a top surface of the first portion 422.

A horizontal cross-section of the coupling slot 423 may be defined in the same shape as that of the lever coupling portion 445.

For example, the lever coupling portion 445 may be coupled to the coupling slot 423 in a press-fitting manner.

With the lever coupling portion 445 inserted into the coupling slot 423, the lever coupling portion 445 and the first portion 422 may be coupled to each other by a coupling pin 427. The first portion 422 may include a through-hole 428 through which the coupling pin 427 passes. The through-hole 428 may extend in the horizontal direction from a side surface of the first portion 422 to communicate with the coupling slot 423.

When the coupling pin 427 passes through the through-hole 428 and is inserted into the pin insertion hole 446 of the lever coupling portion 445, the lever coupling portion 445 and the lever 420 may be prevented from being separated from each other.

In the state in which the lever 420 and the lever coupling portion 445 are coupled by the coupling pin 427, the top surface of the first portion 422 may be spaced apart from the bottom surface of the body 410.

The lever 420 may further include a second portion 424 extending in the horizontal direction from the first portion 422.

A vertical length of the second portion 424 may be less than that of the first portion 422. A top surface of the second portion 424 may be disposed lower than the top surface of the first portion 422.

The reason in which the vertical length of the first portion 422 is greater than the vertical length of the second portion 424 is to secure a depth into which the lever coupling portion 445 is inserted.

The second portion 424 may be in contact with the bracket body 320. Alternatively, the lever 420 may further include a roller 430 that is coupled to the second portion 424 and is in contact with the bracket body 320.

In this specification, a portion of the lever 420, which is in contact with the bracket body 320, may be referred to as a contact portion. In this case, the second portion 424 may be the contact portion, or the roller 430 may be the contact portion. FIG. 7 illustrates an example in which the roller 430 is provided on the second portion 424. The roller 430 may be rotatably coupled to the second portion 424. When the rotation roller 430 is in contact with the bracket body 320, frictional force may be reduced more than when the second portion 424 is in contact with the bracket body 320, and wear due to friction may be reduced.

The second portion 424 may include a roller accommodation portion 425 in which a portion of the roller 430 is accommodated.

A vertical length of the roller 430 may be less than a vertical length of the second portion 424. The roller accommodation portion 425 may be disposed between top and bottom surfaces of the second portion 424. That is, the roller accommodation portion 425 may be disposed at a position spaced apart from the top surface of the second portion 424 by a predetermined distance and at a position spaced apart from the bottom surface of the second portion 424 by a predetermined distance.

In the state in which the roller 430 is accommodated in the roller accommodation portion 425, a roller coupling pin 432 couples the roller 430 to the second portion 424.

Thus, the roller 430 may be supported by the lever 420 so as to be rotatable with the roller coupling pin 432 as the rotational center.

A diameter of the roller 430 may be greater than a recessed depth (a depth in the horizontal direction based on FIG. 5) of the roller accommodation portion 425. A diameter of the roller 430 may be greater than a width of the second portion 424.

Thus, in the state where the roller 430 is coupled to the lever 420 by the roller coupling pin 432, the roller 430 may protrude outward from the second portion 424.

The elastic member 450 may be, for example, a torsion spring. The elastic member 450 may include a body portion 452 provided by winding a wire multiple times. The body portion 452 may have a cylindrical or truncated cone shape.

The elastic member 450 may further include a first extension portion 454 extending from a lower end of the body portion 452. The first extension portion 454 may extend downward from the body portion 452.

The first extension portion 454 may be inserted into the connection groove 443 of the connector 440. For example, the first extension portion 454 may be inserted into the connection groove 443 in a press-fitting manner.

The elastic member 450 may further include a second extension portion 456 extending from an upper end of the body portion 452. The second extension portion 456 may extend upward from the body portion 452.

The auto closing device 40 may further include a cap 470 covering an upper opening of the body 410.

The cap 470 may include a connection groove 472 into which the second extension portion 456 is inserted. The connection groove 472 may be defined by being recessed upward from a bottom surface of the cap 470. For example, the first extension portion 456 may be inserted into the connection groove 443 in a press-fitting manner.

The cap 470 may further include a first coupling hole 474 aligned with a coupling hole 414 of the body 410. A coupling member (not shown) may be coupled to the coupling hole 414 of the body 410 and the first coupling hole 474. Thus, the cap 470 and the body 410 may be coupled to each other by the coupling member.

The cap 470 may further include one or more second coupling holes 476. A coupling member (not shown) may pass through the second coupling hole 476 and be coupled to the first door 21.

Since the cap 470 is coupled to the body 410, a position of the cap 470 is fixed. On the other hand, the connector 440 is rotatable within the body 410.

Since a second extension end 456 of the elastic member 450 is connected to the cap 470, and a first extension end 454 is connected to the connector 440, in this embodiment, the second extension end 456 may be referred to as a fixed end, and the first extension portion 454 may be referred to as a movable end.

Thus, in a state in which the second extension portion 456 is fixed, the first extension portion 454 is rotatable together with the lever 420.

When the first extension portion 454 of the elastic member 450 rotates in one direction while the second extension portion 456 is fixed, the elastic member 450 accumulates an elastic force. The elastic force accumulated by the elastic member 450 may act on the lever 420 so that the lever 420 rotates in another direction opposite to the one direction.

In this manner, the elastic force accumulated by the elastic member 450 substantially acts on the first door 21 in the process of closing the first door 21 so that the first door 21 is automatically closed from a predetermined position.

The auto closing device may further include a bearing 460 that reduces friction between the connector body 442 and the lower wall of the body 410. The bearing 460 is seated on an upper side of the lower wall of the body 410, and the lever coupling portion 445 may pass through the bearing 460.

Figure 8:
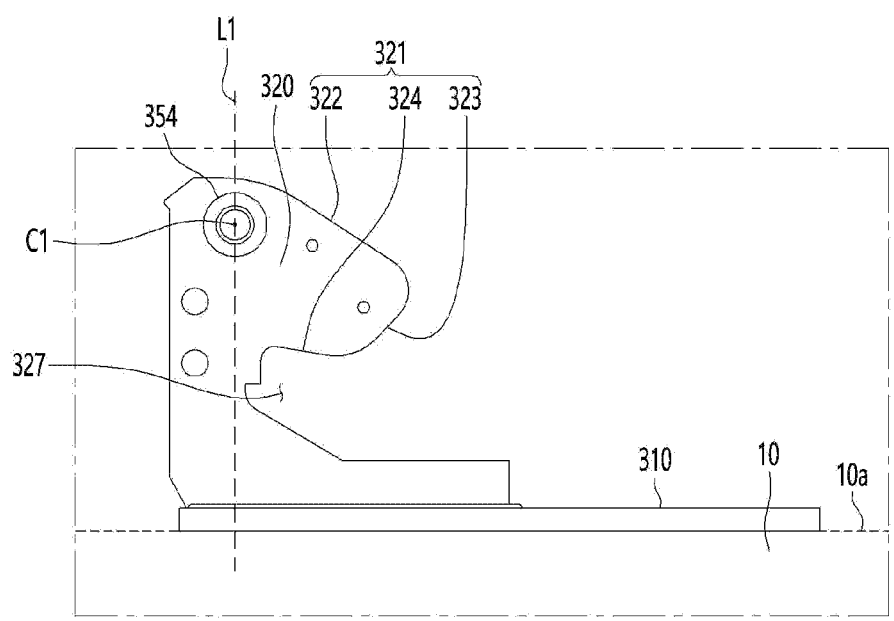
FIG. 8 is a view illustrating the hinge bracket fixed to a cabinet when viewed from the below.

FIG. 8 is a view illustrating the hinge bracket fixed to the cabinet when viewed from the below.

Referring to FIG. 8, the bracket body 320 of the hinge bracket 30 may include a contact surface that is in contact with the lever 420.

For example, the roller 430 of the lever 420 may be in contact with the contact surface. While the lever 420 moves along the contact surface, the lever 420 may rotate.

The contact surface may include a first surface 322 on which the lever 420 is in initially contact with the contact surface in the process of closing the first door 21. In a state where the first door 21 is opened at a predetermined angle or more, the lever 420 may not be in contact with the first surface 322, and in the process of closing the first door 21, the lever 420 may be in contact with the first surface 322.

The first surface 322 is not only disposed to be inclined with respect to the front surface 10a of the cabinet 10, but also disposed to be inclined with respect to a virtual line L1 that is perpendicular to the front surface 10a of the cabinet 10 by passing through a rotational center line C1 of the first door 21. The rotational center line C1 is a line passing through the rotational center of the first door 21.

The first surface 322 may be inclined in a direction away from the virtual line L1 as the first surface 322 approaches the front surface 10a of the cabinet 10.

The contact surface may further include a second surface 323 extending from the first surface 322. The second surface 323 may be inclined with respect to the first surface 322. A length of the second surface 323 may be less than that of the first surface 322.

The second surface 323 may be inclined not only with respect to the front surface 10a of the cabinet 10, but also with respect to the virtual line L1.

The second surface 323 may be inclined in a direction closer to the virtual line L1 as the second surface 323 approaches the front surface 10a of the cabinet 10.

The contact surface may further include a third surface 324 extending from the second surface 323. The third surface 324 may be inclined with respect to the second surface 323.

The third surface 324 may be inclined not only with respect to the front surface 10a of the cabinet 10, but also with respect to the virtual line L1.

The third surface 324 extends in a direction closer to the virtual line L1 as a distance from the front surface 10a of the cabinet 10 increases.

The bracket body 320 may further include an accommodation groove 327 that accommodates the roller 430 of the lever 420. As the roller 430 is being accommodated in the accommodation groove 327, the roller 430 that is in contact with the second surface 323 is now in contact with the third surface 324. That is, in the state in which the first door is closed, the roller 430 may be disposed in the accommodation groove 327 and may be in contact with the third surface 324.

Figure 9:
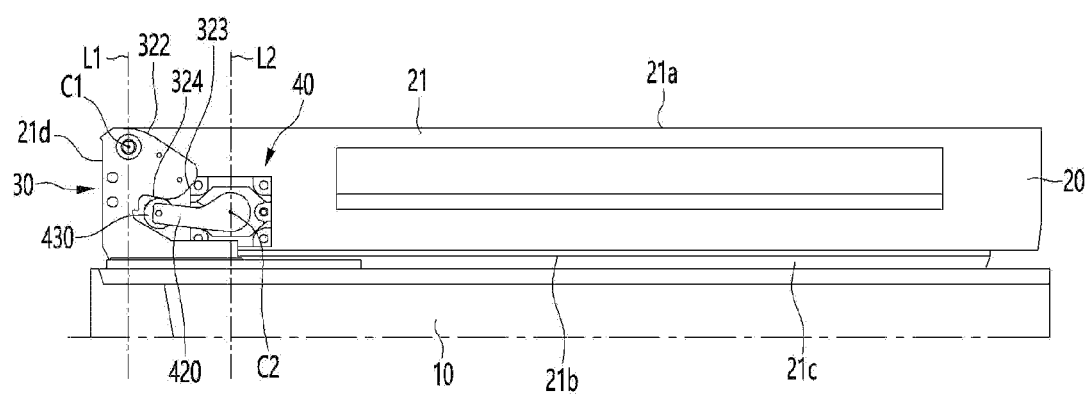
FIG. 9 is a view illustrating a position of a lever of the auto closing device in a state in which a first door is closed.

FIG. 9 is a view illustrating a position of the lever of the auto closing device in the state in which a first door is closed. FIG. 9 illustrates a view of the auto closing device viewed from a lower side of the first door.

Referring to FIG. 9, when the refrigerator according to this embodiment is installed in a furniture cabinet, it is preferable that a thickness of the first door 21 is reduced to reduce the forward protrusion of the first door 21 from the front surface of the furniture cabinet.

When the thickness of the first door 21 is reduced, in order for the auto closing device 40 to be installed in the first door 21, the auto closing device 40 may be installed at a position spaced apart from the rotational center line C1 of the first door 21.

For example, when the first door 21 is closed, the rotational center line C1 of the first door 21 and the rotational center line C2 of the lever 420 are spaced apart from each other. The rotational center line C2 of the lever 420 is a line passing through the rotational center of the lever 420.

In addition, when the refrigerator is installed in the furniture cabinet, an opening angle needs to be secured so that the first door 21 does not collide with the furniture cabinet during the rotation of the first door 21.

Therefore, in this embodiment, the rotational center line C1 of the first door 21 may be disposed close to the front and side surfaces of the first door 21.

For example, in the state in which the first door 21 is closed, the rotational center line C1 of the first door 21 may be disposed closer to a front surface 21a than a rear surface 21b of the first door 21.

A distance between the rotational center line C1 of the first door 21 and the rear surface 21*b* of the first door 21 may be more than twice a distance between the rotational center line C1 of the first door 21 and the front surfaces 21*a* of the first door 21.

In the state in which the first door 21 is closed, the rotational center line C1 of the first door 21 may be disposed closer to a first side surface 21*d* of the two side surfaces of the first door 21.

In the state in which the first door 21 is closed, a distance between the rotational center line C1 of the first door 21 and the first side surface 21*d* may be less than that between the rotational center line C1 of the first door 21 and the rear surface 21*b* of the first door 21.

In the state in which the first door 21 is closed, a distance between the rotational center line C1 of the first door 21 and the front surface 21*a* of the first door 21 may be less than between the front surface 21*a* of the first door 21 and the rotational center line C2 of the lever 420.

In the state in which the first door 21 is closed, a distance between the rotational center line C1 of the first door 21 and the front surface 10*a* of the cabinet 10 may be greater than that between the rotational center line C2 of the lever 420 and the front surface 10*a* of the cabinet 10.

In the state in which the first door 21 is closed, the roller 430 of the lever 420 may be disposed on an area between the virtual line L1 (first virtual line) and the virtual line L2 (second virtual line) perpendicular to the front surface 10*a* of the cabinet 10 while passing through the rotational center line C2 of the lever 420.

A gasket 21*c* that is in contact with the cabinet 10 in the state in which the first door 21 is closed may be provided on the rear surface 21*b* of the first door 21. In order for the gasket 21*c* to be coupled to the first door 21, a groove in which a portion of the gasket 21*c* is accommodated may be defined in the rear surface of the first door 21.

In the state in which the first door 21 is closed, the roller 430 of the lever 420 may be disposed closer to the rear surface 21*b* of the first door 21 than the rotational center line C1 of the first door 21.

In the state in which the first door 21 is closed, a portion of the first surface 322 may be disposed closer to the front surface 21*a* of the first door 21 than to the rotational center line C1 of the first door 21. In the state in which the first door 21 is closed, the other portion of the first surface 322 may be disposed closer to the rear surface 21*b* of the first door 21 than the rotational center line C1 of the first door 21.

In the state in which the first door 21 is closed, the second surface 323 and the third surface 324 may be disposed closer to the rotational center line C1 of the first door 21 than the rear surface 21*b* of the first door 21.

In the state in which the first door 21 is closed, the second surface 323 and the third surface 324 may be disposed closer to the rotational center line C2 of the lever 420 than the front surface 21*a* of the first door 21.

The roller 430 of the lever 420 is maintained in the state of being in contact with the third surface 324 while being accommodated in the accommodation groove 327.

Since the roller 430 is in contact with the third surface 324, the closed state of the first door 21 may be stably maintained when the first door 21 is closed.

Figure 10:
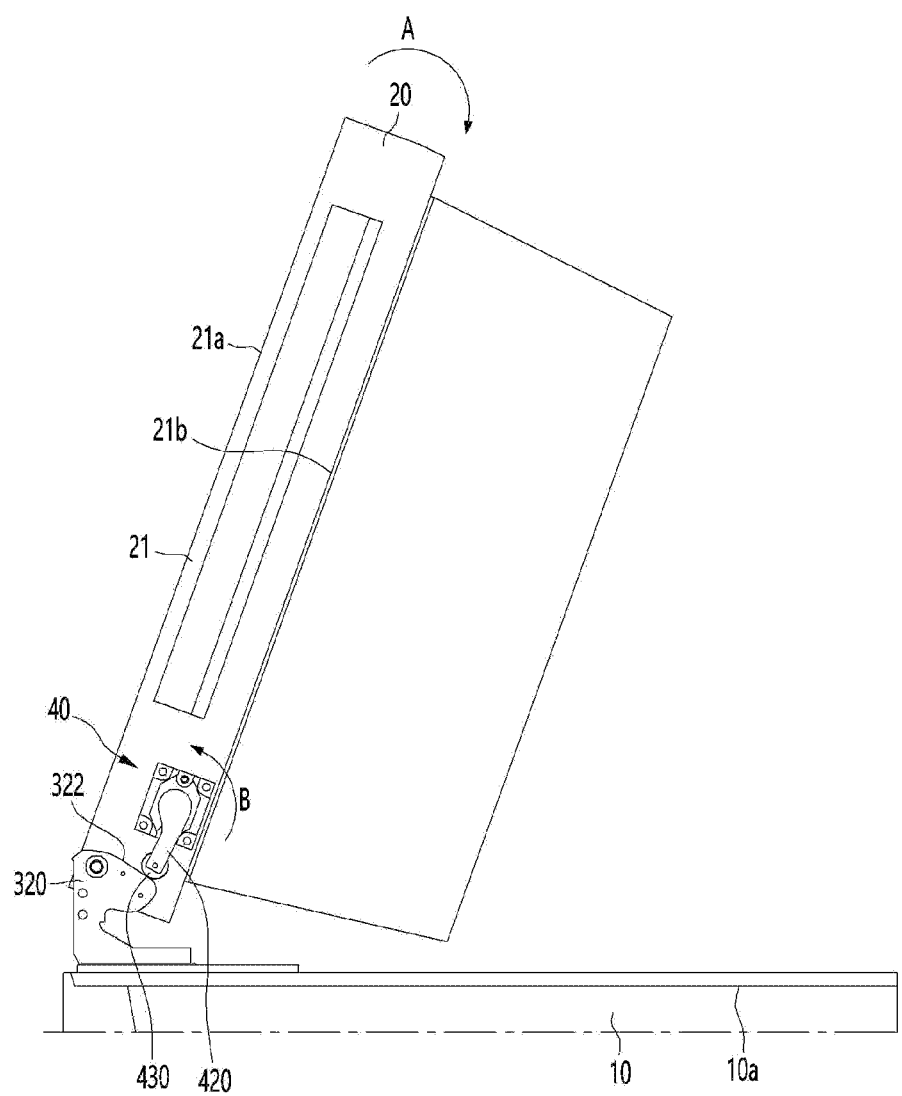
FIG. 10 is a view illustrating a state in which the lever moves along a first surface of a bracket body in the process of closing the first door.
Figure 11:
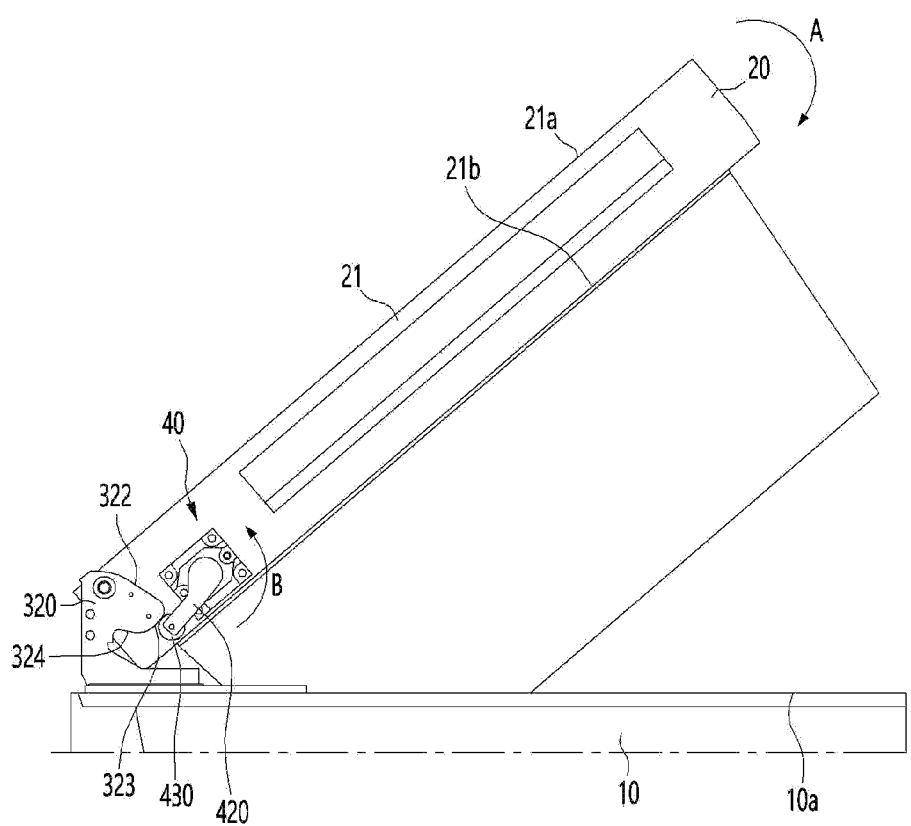
FIG. 11 is a view illustrating a state in which the lever moves along a second surface in the process of closing the first door.
Figure 12:
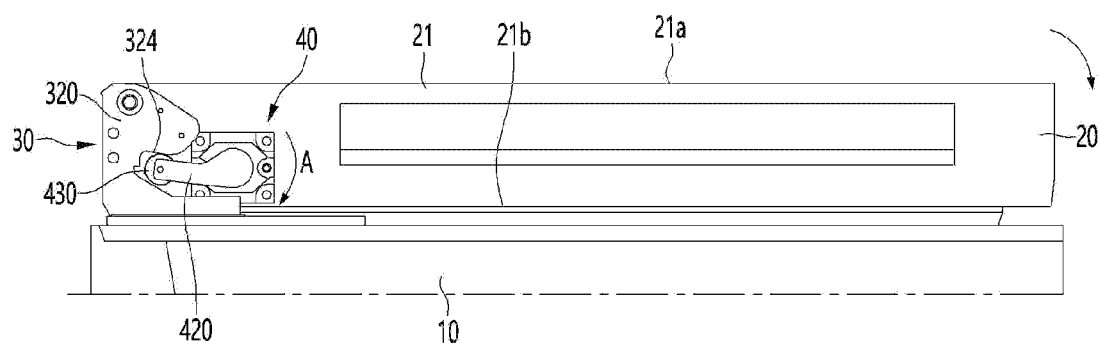
FIG. 12 is a view illustrating a position of the lever in the state in which the first door is closed.

FIG. 10 is a view illustrating a state in which the lever moves along the first surface of the bracket body in the process of closing the first door, FIG. 11 is a view illustrating a state in which the lever moves along the second surface in the process of closing the first door, and FIG. 12 is a view illustrating a position of the lever in the state in which the first door is closed.

Referring to FIGS. 10 to 12, when the lever 420 is spaced apart from the bracket body 320 in the process of closing the first door 21 after the first door 21 is opened, external force may not act on the lever 420.

In the process of closing the first door 21 in a direction A, when the door 21 is angled at a reference angle with respect to the front surface 10*a* of the cabinet 10, the lever 420 may be in contact with the first surface 322 of the bracket body 320.

When the first door 21 further rotates in the A direction while the lever 420 is in contact with the first surface 322 of the bracket body 210, the lever 420 may rotate in a direction B opposite to the direction A by an inclination of the first surface 322.

The first surface 322 applies resistive force to the lever 420 so that the lever 420 rotates in the direction B.

When the lever 420 is rotated in the direction B, the first extension portion 454 of the elastic member 450 also rotates in the direction B so that the elastic member 450 accumulates elastic force.

When the lever 420 approaches the second surface 323 while the second door 21 is closing, the elastic force accumulated in the elastic member 450 increases.

When the lever 420 is in contact with the second surface 323 while the first door 21 is closing, the lever 420 additionally rotates in the direction B. When the lever 420 additionally rotates in the direction B, the elastic force accumulated in the elastic member 450 increases.

According to this embodiment, the elastic force accumulated in the elastic member 450 is maximized in the state in which the lever 420 is in contact with the second surface 323. The elastic force accumulated in the elastic member 450 in the state in which the lever 420 is in contact with the second surface 323 is greater than that accumulated in the elastic member 450 in the state in which the lever 420 is in contact with the first surface 322.

The lever 420 may rotate in the direction A in the state in which the lever 420 is in contact with the second surface 323 according to an angle of the second surface 323. When the lever 420 rotates in the A direction, the elastic force accumulated in the elastic member 450 decreases. In this case, the elastic force accumulated in the elastic member 450 is maximized in the state in which the lever 420 is in contact with the first surface 322. Since the lever 420 inertially rotates in the direction A, and the rotation angle of the lever 420 in the direction A is less than the rotation angle of the lever 420 in the direction B, a torque loss of the lever 420 may be reduced, or a degree of reduction of the elastic force accumulated in the elastic member 450 may be minimized.

Alternatively, according to the angle of the second surface 323, the lever 420 may rotate in the direction B in the state in which the lever 420 is in contact with a portion of the second surface 323, and also, the lever 420 may rotate in the direction A in the state in which the lever 420 is in contact with the other portion of the second surface 323. Even in this case, the elastic force accumulated in the elastic member 450 is maximized in the state in which the lever 420 is in contact with the second surface 323.

When the lever 420 deviates from the second surface 323 in the process of closing the first door 21, the resistive force applied to the lever 420 is removed, and the elastic force accumulated in the elastic member 450 may act on the lever 420 to increase in rotation angle in the direction A of the lever 420, and thus, the first door 21 may be automatically closed.

That is, while the lever 420 moves along the third surface 324, the elastic force accumulated in the elastic member 450 decreases. That is, the elastic force decreases as it acts as the closing force of the first door 21.

Here, since the lever 420 rotates while the roller 430 of the lever 420 is being accommodated in the accommodation groove 327, the elastic force of the elastic member 450 acts in a direction crossing the third surface 324 or in a normal direction in the state in which the roller 430 is in contact with the third surface 324. Therefore, the elastic force may be prevented from being concentrated at a specific point of the third surface 324, and efficiency of transmitting the elastic force to the third surface 324 is high.

As described above, when the elastic force of the elastic member 450 acts in a direction crossing the third surface 324, rattling of the first door 21 or a phenomenon in which the first door 21 is closed and then opened again due to the excessive action of the elastic force at a time point at which the first door 21 is closed may be prevented from occurring.

In this embodiment, torque of the lever 420 may be maximized when the opening angle (an angle angled between the door and the front surface of the cabinet when the door is closed) of the first door 21 is approximately 10 degrees or less. When the first door 21 is disposed in the left and right direction, a pillar may be provided on either the left door or the right door. The pillar serves to block leakage of cold air from the storage space between the left and right doors.

For example, the pillar is rotatably disposed on the left door, and the pillar is automatically unfolded while the left door is closed. An angle at which the pillar is unfolded may be a case in which the opening angle of the left door is approximately 10 degrees or less and be designed so that the torque is maximized when the opening angle of the left door is approximately 10 degrees or less so that the pillar is easily unfolded.

In this embodiment, as illustrated in FIG. 12, the roller 430 of the lever 420 is in contact with the third surface 324 when the door is closed.

The third surface 324 may provide the resistive force to the lever 420, and thus, the lever 420 exists in a substantially rotating state at a predetermined angle in the state in which the first door 21 is closed so that the elastic member 450 is maintained in the state of accumulating a certain amount of elastic force. Therefore, since the elastic member 450 applies force in the direction in which the first door 21 is closed in the state in which the first door 21 is closed, the closed state of the first door 21 may be stably maintained.

In the state in which the first door 21 is closed, and the lever 420 is in contact with the third surface 324, the elastic force accumulated in the elastic member 450 may be equal to or greater than the elastic force accumulated in the elastic member 450 in a state in which the first door 21 is opened at a predetermined angle, and the lever 420 is spaced apart from the first surface 322.

In summary, when the first door 21 is closed, while the lever 420 moves along a partial section of the contact surface 321, the elastic force is accumulated in the elastic member 450 and is maximized, and the elastic force of the elastic member 450 acts on the lever 420 in a different section of the contact surface so that the first door 21 is automatically closed.

While the lever 420 moves along a portion of the contact surface 321 based on the front surface 10a of the cabinet 10, the roller 430 gets closer to the front surface 10a of the cabinet 10, and while the lever 420 moves along the other portion of the contact surface 321, the contact surface 321 of the bracket body 320 is defined so that the roller 430 is away from the front surface 10a of the cabinet 10.

Alternatively, while the lever 420 moves along a portion of the contact surface 321 based on the rear surface 21b of the first door 21, the roller 430 gets closer to the rear surface 21b, and while the lever 321 moves along the other portion of the contact surface 321, the contact surface 321 of the bracket body 320 is defined so that the roller 430 is away from the rear surface 21b.

For example, while the contact portion of the lever 420 moves along the first surface 322 and the second surface 323, the contact portion may get closer to the rear surface 21b of the first door 21. While the contact portion of the lever 420 moves along the third surface 324, the contact portion may be away from the rear surface 21b of the first door 21.

As another example, while the contact portion of the lever 420 moves along the first surface 322, the contact portion may get closer to the rear surface 21b of the first door 21. While the contact portion of the lever 420 moves along a portion of the second surface 323, the contact portion may get closer to the rear surface 21b of the first door 21, and while the contact portion of the lever 420 moves along a remaining portion of the second surface 323, the contact portion may be away from the rear surface 21b of the first door 21. While the contact portion of the lever 420 moves along the third surface 324, the contact portion may be away from the rear surface 21b of the first door 21.

A case in which the first door 21 is opened will be briefly described.

When the first door 21 is initially opened in the closed state, the lever 420 moves along the third surface 324. While the lever 420 moves along the third surface 324, the elastic force accumulated in the elastic member 450 increases.

When the opening angle of the first door 21 increases, the lever 420 moves from the third surface 324 to the second surface 323 and then moves along the second surface 323.

While the lever 420 moves along the second surface 323, the elastic force accumulated in the elastic member 450 may decrease slightly. Alternatively, while the lever 420 moves along the second surface 323, the elastic force accumulated in the elastic member 450 may increase.

When the opening angle of the first door 21 further increases, the lever 420 moves from the second surface 323 to the first surface 322 and then moves along the first surface 322. While the lever 420 moves along the first surface 322, the elastic force accumulated in the elastic member 450 decreases. When the lever 420 is spaced apart from the first surface 322, the elastic force accumulated in the elastic member 450 is minimized.

The invention claimed is:

1. A refrigerator comprising:
a cabinet having a storage space;
a hinge bracket coupled to the cabinet;
a door to open and close the storage space, and rotatably coupled to a shaft provided at the hinge bracket; and
an auto closing device installed at the door at a position spaced apart from a rotational center line of the door and to interact with the hinge bracket in a process of closing the door to automatically close the door,
wherein the auto closing device comprises a lever and an elastic member to elastically support the lever, and
the hinge bracket comprises a contact surface to contact with the lever, wherein the contact surface includes a contour so that, during a process of closing the door, while a contact portion of the lever moves along a portion of the contact surface, the contact portion moves closer to a front surface of the cabinet, and while the contact portion moves along an other portion of the contact surface, the contact portion moves away from the front surface of the cabinet.

2. The refrigerator of claim 1, wherein, based on a virtual line that is perpendicular to the front surface of the cabinet and passes through the rotational center line of the door, the contact surface comprises:
   a first surface inclined in a direction that is farther from the virtual line as the first surface is closer to the front surface of the cabinet;
   a second surface inclined in a direction that is closer to the virtual line as the second surface is closer to the front surface of the cabinet; and
   a third surface extending in a direction that is closer to the virtual line as the third surface is farther away from the front surface of the cabinet.

3. The refrigerator of claim 2, wherein, the contact portion of the lever moves closer to the front surface of the cabinet as the contact portion moves along the first surface and then along the second surface and
   the contact portion moves away from the front surface of the cabinet as the contact portion moves along the third surface away from the second surface.

4. The refrigerator of claim 3, wherein, the contact portion of the lever is maintained in a state of being in contact with the third surface when the door is in the closed state.

5. The refrigerator of claim 2, wherein, the contact portion of the lever moves closer to a rear surface of the door as the contact portion moves along the first surface and then along the second surface, and
   the contact portion moves away from the rear surface of the door as the contact portion moves along the third surface away from the second surface.

6. The refrigerator of claim 2, wherein, the contact portion of the lever moves closer to a rear surface of the door as the contact portion moves along the first surface toward the second surface,
   the contact portion moves closer to the rear surface of the door the contact portion moves along a portion of the second surface toward the third surface,
   the contact portion moves away from the rear surface of the door as the contact portion moves along a remaining portion of the second surface away from the portion of the second surface, and
   the contact portion move away from the rear surface of the door as the contact portion moves along the third surface away from the remaining portion of the second surface.

7. The refrigerator of claim 2, wherein, the door rotates in a first direction to be closed,
   the lever rotates in a second direction opposite to the first direction as the contact portion of the lever moves along the first surface toward the second surface, and
   the lever rotates in the first direction as the contact portion along the third surface away from the second surface.

8. The refrigerator of claim 2, wherein, when the door rotates in a first direction to be closed,
   the lever rotates in a second direction opposite to the first direction as the contact portion of the lever moves along the first surface toward the second surface,
   the lever rotates in the second direction as the contact portion moves along a portion of the second surface away from the first surface,
   the lever rotates in the first direction as the contact portion moves along a remaining portion of the second surface away from the portion of the second surface, and
   the lever rotates in the first direction as the contact portion moves along the third surface away from the remaining portion of the second surface.

9. The refrigerator of claim 2, wherein, the door rotates in a first direction to be closed,
   the lever rotates in a second direction opposite to the first direction as the contact portion of the lever moves along the first surface toward the second surface,
   the lever rotates in the first direction as the contact portion of the lever moves along the second surface toward the third surface, and
   the lever rotates in the first direction as the contact portion of the lever moves along the third surface away from the second surface.

10. The refrigerator of claim 1, wherein the lever rotates based on a rotational center line spaced apart from the rotational center line of the door.

11. The refrigerator of claim 10, wherein, in the state in which the door is closed, the rotational center line of the lever is disposed closer to the front surface of the cabinet than the rotational center line of the door.

12. The refrigerator of claim 10, wherein the lever comprises a roller rotatably coupled to the lever, and the contact portion is the roller.

13. The refrigerator according to claim 10, wherein the auto closing device comprises:
    a body to accommodate the elastic member; and
    a connector connected to the elastic member within the body,
    wherein the connector comprises a lever coupling portion that extends to an outside of the body, and
    the lever is coupled to the lever coupling portion.

14. The refrigerator of claim 13, wherein the connector rotates together with the lever,
    the elastic member comprises:
    a body portion provided by winding a wire several times; and
    an extension portion to extend from the body portion,
    wherein the extension portion is coupled to the connector at a position spaced apart from a rotational center line of the connector.

15. A refrigerator comprising:
    a cabinet having a storage space;
    a hinge bracket coupled to the cabinet;
    a door to open and close the storage space and rotatably coupled to a shaft provided at the hinge bracket; and
    an auto closing device installed at the door at a position spaced apart from a rotational center line of the door and to interact with the hinge bracket in a process of closing the door to automatically close the door,
    wherein the auto closing device comprises a lever and an elastic member to elastically support the lever, and
    the hinge bracket comprises a contact surface to contact with the lever,
    wherein the contact surface includes a contour so that, while a contact portion of the lever moves along a portion of the contact surface, the contact portion moves closer to a rear surface of the door, and while the contact portion moves along an other portion of the contact surface, the contact portion moves away from the rear surface of the door.

16. A refrigerator comprising:
a cabinet having a storage space;
a hinge bracket coupled to the cabinet;
a door to open and close the storage space and rotatably coupled to a shaft provided at the hinge bracket; and
an auto closing device installed at the door at a position spaced apart from a rotational center line of the door and to interact with the hinge bracket in a process of closing the door to automatically close the door,
wherein the auto closing device comprises a lever and an elastic member to elastically support the lever, and
the hinge bracket comprises a contact surface to contact with the lever, the contact surface includes a contour so that,
during a process of closing the door, elastic force accumulated in the elastic member increases as the contact portion of the lever moves along a portion of the contact surface, the contact portion moves closer to a front surface of the cabinet, and the elastic force accumulated in the elastic member decreases as the contact portion of the lever moves along an other portion of the contact surface, the contact portion moves away from the front surface of the cabinet, and
the elastic force of the elastic member acts as a closing force of the door in a section of the contact surface in which the elastic force of the elastic member decreases.

17. The refrigerator of claim 16, wherein the elastic force accumulated in the elastic member in the state in which the door is closed is equal to or greater than that the elastic force accumulated in the elastic member in the state in which the lever is spaced apart from the contact surface by an opening of the door.

18. A refrigerator comprising:
a cabinet having a storage space;
a hinge bracket coupled to the cabinet;
a door to open and close the storage space and rotatably coupled to a shaft provided at the hinge bracket; and
an auto closing device installed at the door at a position spaced apart from a rotational center line of the door and to interact with the hinge bracket in a process of closing the door to automatically close the door,
wherein the auto closing device comprises a lever to rotate based on a rotational center line spaced apart from a rotational center line of the door, and an elastic member to increase or decrease in an accumulation of an elastic force while the lever rotates,
the hinge bracket comprises a contact surface to contact with the lever, and
in the state in which the door is closed, the rotational center line of the door is disposed closer to a front surface of the door than a rear surface of the door, and the rotational center line of the lever is disposed closer to the rear surface of the door than the rotational center line of the door.

19. The refrigerator of claim 18, wherein the contact surface includes a contour so that, during a process of closing the door,
while a contact portion of the lever moves along a portion of the contact surface, the contact portion moves closer to the front surface of the cabinet, and while the contact portion of the lever moves along an other portion of the contact surface, the contact portion moves away from the front surface of the cabinet.

20. The refrigerator of claim 19, wherein
in the state in which the door is closed, a portion of the contact surface, which is in contact with the lever, is disposed closer to the front surface of the door than the rotational center line of the lever.

* * * * *